(12) United States Patent
Keselbrener

(10) Patent No.: US 8,203,757 B2
(45) Date of Patent: Jun. 19, 2012

(54) CONTROLLING ERROR DIFFUSION DOT DENSITY

(75) Inventor: Michel Keselbrener, Tel-Aviv (IL)

(73) Assignee: Eastman Kodak Company, Rochester, NY (US)

( * ) Notice: Subject to any disclaimer, the term of this patent is extended or adjusted under 35 U.S.C. 154(b) by 264 days.

(21) Appl. No.: 12/636,879

(22) Filed: Dec. 14, 2009

(65) Prior Publication Data

US 2011/0141496 A1 Jun. 16, 2011

(51) Int. Cl.
*H04N 1/60* (2006.01)

(52) U.S. Cl. ........ 358/1.9; 358/3.03; 358/3.05; 358/3.2; 358/3.23

(58) Field of Classification Search ........... 358/1.1–3.23
See application file for complete search history.

(56) References Cited

U.S. PATENT DOCUMENTS

| | | | |
|---|---|---|---|
| 5,754,309 | A | 5/1998 | Chen et al. |
| 5,917,614 | A | 6/1999 | Levien |
| 6,271,936 | B1 | 8/2001 | Yu et al. |
| 6,628,427 | B1 | 9/2003 | Aoki |
| 2002/0039199 | A1 | 4/2002 | Nose et al. |
| 2005/0083554 | A1 | 4/2005 | Tresser |
| 2005/0195438 | A1 | 9/2005 | Couwenhoven et al. |
| 2007/0097440 | A1 | 5/2007 | Majewicz |

FOREIGN PATENT DOCUMENTS

| | | | |
|---|---|---|---|
| EP | 0 674 426 A1 | 9/1995 | |
| EP | 1 447 971 A2 | 8/2004 | |

OTHER PUBLICATIONS

S. Sugiura and T. Makita; An Improved Multilevel Error Diffusion Method; Journal of Imaging Science and Technology, vol. 39, No. 6, Nov./Dec. 1995, pp. 495-501.
M. Nose and H. Kotera; Modified Error Diffusion with Smoothly Dispersed Dots in Highlight and Shadow; 1998, pp. 379-382.
R. Levien; Output Dependent Feedback in Error Diffusion Halftoning; IS&T Annual Conference, 1993, pp. 115-118.
R. Levien; Practical Issues in Color Inkjet Halftoning; Proceedings of SPIE—IS&T Electronic Imaging, SPIE vol. 2008, 2003, pp. 537-541.
Gabriel Marcu: "Error Diffusion Algorithm With Output Position Constraints for Homogeneous Highlight and Shadow Dot Distribution", Journal of Electronic Imaging, SPIE/IS & T, vol. 9, No. 1, Jan. 1, 2000, pp. 46-51, XP000902784, ISSN: 1017-9909, DOI: DOI:10.1117/1.482721, p. 48, left-hand column.

*Primary Examiner* — Benny Q Tieu
*Assistant Examiner* — Marcellus Augustin
(74) *Attorney, Agent, or Firm* — Nelson Adrian Blish

(57) ABSTRACT

A method for improving printing quality of a digital image using error diffusion screening including the steps for each pixel in a digital image: a) initialize weighted error diffusion value; b) translate first value (220) of each pixel of the digital image to a second value (916); c) translate the second value of each pixel of the digital image to create a third value (920); d) translate the third value of each pixel of the digital image by adding the error diffusion value (216) to create a fourth value (224); e) generate a quantization value for each pixel in the digital image by using at least one threshold value; f) perform geometrical distribution in space of the first quantization (924) utilizing a first pixel mask (1604) and possibly a second pixel mask for setting pixels in designated areas defined by the pixel masks; and g) update said error diffusion value and go to step (b) till all the pixels of the digital image are treated.

10 Claims, 30 Drawing Sheets

```
if ( SYSVAL02 >= THR01 )
{
    SYSVAL03 = QUANT01;
}
else
{
    SYSVAL03 = QUANT02;
}
```

FIG. 4
(PRIOR ART)

```
if ( SYSVAL02 >= THR01 )
{
        SYSVAL03 = QUANT01;
}
else if (SYSVAL02 < (THR01) && SYSVAL04 >= (THR02) )
{
        SYSVAL03= QUANT02;
}
else if (SYSVAL02 < (THR02) && SYSVAL02 >= (THR03) )
{
        SYSVAL03 = QUANT03;
}
else
{
        SYSVAL03 = QUANT04;
}
```

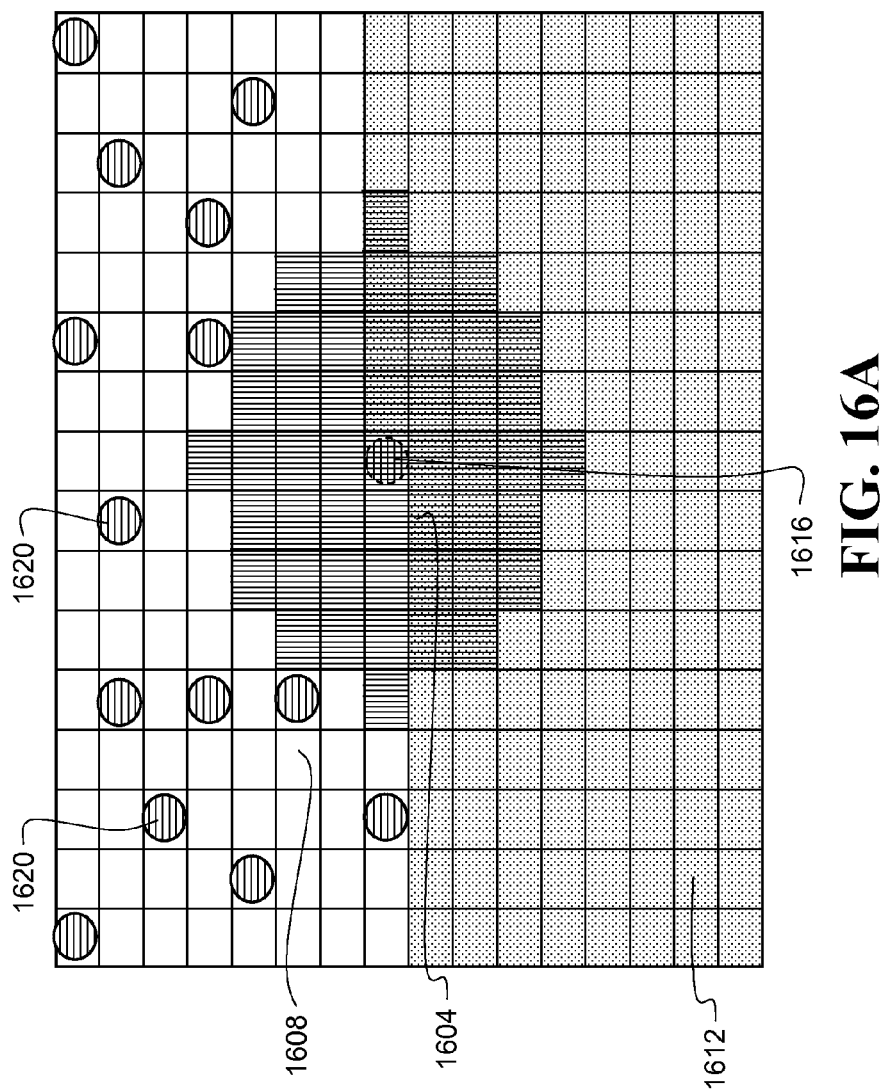

```
Get mask for specific SYSVAL05 and Specific QUANT1 for comparison
Screen image analysis according to convex mask
Generate random noise (0-1)
If (there is not a pixel with QUANT1 && noise>0.5)
{
    SYSVAL06 = QUANT1;
}
```

FIG. 17

```
Get mask1 for specific SYSVAL05 and Specific QUANT1 for comparison
Screen image analysis according to convex mask
Generate random noise (0-1)
If (there is not a pixel with QUANT1 && noise>0.5)
{
    Get mask2 for specific SYSVAL05 and Specific QUANT2 for comparison
    Perform mask and image comparison
    If (there is not a pixel with QUANT2 )
    {
            SYSVAL06 = QUANT1;
    }
}
```

FIG. 18

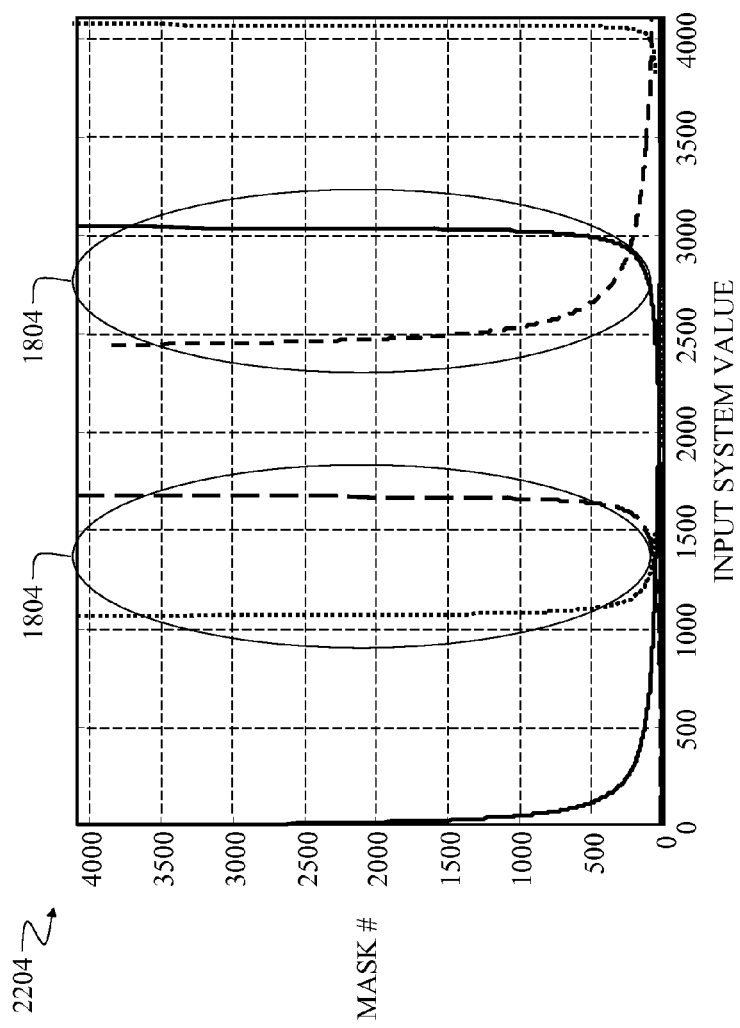

CONTROLLING ERROR DIFFUSION DOT DENSITY

FIELD OF THE INVENTION

This present invention relates to an apparatus and method for smoothing multilevel printing using multilevel error diffusion screening for a real time system.

BACKGROUND OF THE INVENTION

Printing systems with an ability to generate multilevel printed single dots increase the number of gray levels that can be achieved compared to binary systems. Multilevel halftoning mechanisms based on error diffusion are used to render an image on a device with a number of levels greater than two. Multilevel error diffusion algorithms generate a dot distribution with high frequency noise ("blue noise") and visually pleasant dot patterns. Error diffusion algorithms, which typically provides better image quality compared to other blue noise dither algorithms were widely investigated and used because they can be easily embedded into a processor for real time purposes.

A two-dimensional multilevel "error diffusion" algorithm is an adaptive algorithm that uses threshold weighted error feedback to produce patterns with different spatial frequency content, depending on the input image values. The process, shown schematically in FIG. 2, consists of single pass over the input image. Each pixel with a continuous tone value 220 (SYSVAL01) is first modified by adding a previously calculated weighted error to generate value 224 (SYSVAL02). Value 224 is entered into threshold computing component 204 to generate an output value 228 (SYSVAL03) by comparing to value 224 to first threshold value 304 (THR01), as indicated by the meta program shown FIG. 4. The output value 228 is a quantization value that can get one of first quantization value 308 (QUANT01) or last quantization value 312 (QUANT02), in a two level system. For example, FIG. 3 shows that for an 8-bits contone image, the first threshold value 304 may be set to 127 wherein the quantization values 308 and 312 are respectively 0 and 255. Related to a printing device, first quantization value 308 can be defined as a printer dot OFF (no dot on the paper) and last quantization value 312 will be set as dot ON. The difference between the output value 228 and the modified input value 224 is computed to generate error 212. Error 212 is entered into the weighted error feedback component 208 to generate weighted error value 216. Weighted error value 216 is passed to the neighboring pixels that have not been processed yet as shown in FIG. 2, using an error distribution matrix shown in FIG. 5. Error diffusion kernel matrix 504 may be constructed by 12 coefficients, which are defined geometrically and are ordered into three lines in this case. In general these coefficients are normalized such that their total sum equals to 1.

A multilevel error diffusion algorithm is a natural generalization of the two levels error diffusion algorithm for multilevel system. Multilevel system means that there is a control of printer dot size or drop volume in term of the amount of ink per dot type. In this case threshold computing component 204 is replaced by a multilevel quantization component 604 as is shown in FIG. 6. In this example, for a four levels system, the modified input value 224 of a pixel is compared to first threshold value 304 (THR01), second threshold value 704 (THR02), and third threshold value 708 (THR03) as is shown in FIG. 7 and in FIG. 8, to create one of four quantization system values, first quantization value 308 (QUANT01), third quantization value 712 (QUANT02), fourth quantization value 716 (QUANT03), and last quantization value 312 (QUANT04).

One of the draw backs of multilevel error diffusion algorithm is the textures artifacts 104 such as "worm pattern" (discussed below), and discontinuity and contouring around quantization levels (See FIG. 1B). Sugiura and Makita (An Improved Multilevel Error Diffusion Method; The Journal of Imaging Science and Technology, 1995, Vol. 39, No. 6, pp. 495-501) explained that this effect appears when no error occurs at quantization levels. For the same reason, for binary system, "worm" pattern and discontinuity appear at highlight and shadow tones. Solutions were proposed to smooth highlight and shadow tones for binary systems. Some of them proposed to add noise to the input pixels value such as Masake and Hiroaki (Modified Error Diffusion with Smoothly Disperse Dots in Highlight and Shadow; Japan Hardcopy '98, 1998, pp. 379-382). In the Raph Levien paper (Output Dependent Feedback in Error Diffusion Halftoning; IS&T 46th Annual Conference, May 1993, pp. 115-118); and U.S. Pat. No. 5,917,614 (Levien), it was proposed to break highlight and shadow patterns, by applying modulation to the error diffusion threshold term. The modulation is based on a difference between an "actual distance" and between a "predefined expected" distance. This distance is defined as the distance between actual pixel (pixel being considered), to the closest turned on pixel. The "predefined expected" distance is a function of the input pixel value. Levien addresses shortly the problem of multilevel error diffusion in an additional paper, Practical Issues in Color Inkjet Halftoning; IS&T Electronic Imaging, SPIE Vol. 5008, 1993, pp. 537-541, wherein a modulation of the threshold value is again proposed based on the distance parameter previously described.

For multilevel system, Sugiura and Makita proposed to smooth the quantization transition by applying noise to the input pixels. U.S. Pat. No. 6,271,936 (Yu et al.) and U.S. Publication No. 2005/0195438 (Couwenhoven et al.) proposed to combine error diffusion techniques with dithering techniques based on periodical threshold array.

The present invention is directed towards improving transition smoothness at quantization values by controlling the density and position of quantized dots value around quantization area, and keeping the pleasant dot distribution of error diffusion.

SUMMARY OF THE INVENTION

Briefly, according to one aspect of the present invention, there is provided a method for improving printing quality of a digital image using error diffusion screening including the steps for each pixel in the digital image:
  a) initializing a weighted error diffusion value;
  b) translating a first value of each pixel of the digital image to a second value, when the second value is represented by at least same number of bits as the first value to enhance toning;
  c) translating the second value of each pixel of the digital image to create a third value, the third value is represented by at least same number of bits as the second value to smooth non-monotonic behavior during digital quantization due to processor precision limitation or physical behavior;
  d) translating the third value of each pixel of the digital image by adding the error diffusion value to create a fourth value;

e) generating a quantization value for each pixel in the digital image by performing quantization on the fourth value of each pixel of the digital image using at least one threshold value;

f) performing geometrical distribution in space of the quantization value comprising the steps of: analyzing location and value of neighboring quantization values designated by a first pixel mask and a second pixel mask; if a pixel with the first quantization value appears in the area designated by said the pixel mask or a second quantization value appears in the area designated by the second pixel mask then go to step (g), if a pixel with the first quantization value does not appear in the area designated by the first pixel mask and a second quantization value does not appear in the area designated by the second pixel mask then set a pixel in the area designated by the first pixel mask to the first quantization value; and g) update the error diffusion value and go to step (b) till all the pixels of the digital image are treated.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

FIG. 4 is prior art showing two levels quantization frame work;

FIG. 8 is prior art showing quantization module for four levels;

FIG. 16A shows an example of mask that can be used as constrain per system value;

FIG. 17 shows a mask and image comparison scheme;

FIG. 18 shows a mask and image comparison scheme;

FIGS. 19A, 19B, 19C shows a system value versus mask number functions;

DETAILED DESCRIPTION OF THE INVENTION

The present invention which is based on a method for multilevel halftoning (shown in FIG. 9) has an input digital image value 220 composed of m by n pixels with $N_{image}$ contone levels per pixel, and an output halftone image value 924 composed of an m by n pixels with $N_{output}$ quantization levels per pixel. Because halftoning processes are mechanisms that reduce the number of digital levels for printing purposes, the number of quantization level of the output image is lower than the number of quantization level of the input image ($2 \leq N_{output} < N_{image}$). The case where $N_{output}=2$ corresponds to a binary printing system. The present method focuses on multilevel halftoning where the number of output quantization level $N_{output}$ is greater than 2 but can also be applied for binary system, where worm patterns appearing at highlight and shadow, will disappears as well. Into the current description, examples and drawings are provided for a 4 levels (2-bits) printing system ($N_{output}=4$) where the output quantization values can be QUANT01=0, QUANT02=85, QUANT03=170, and QUANT01=255. An input digital image value 220 is of 256 levels (8-bits) per pixel ($N_{image}=256$) is assumed. The method described above can be applied to any number of quantization levels (not only 4 levels) and any number of image input level.

Figure 9:
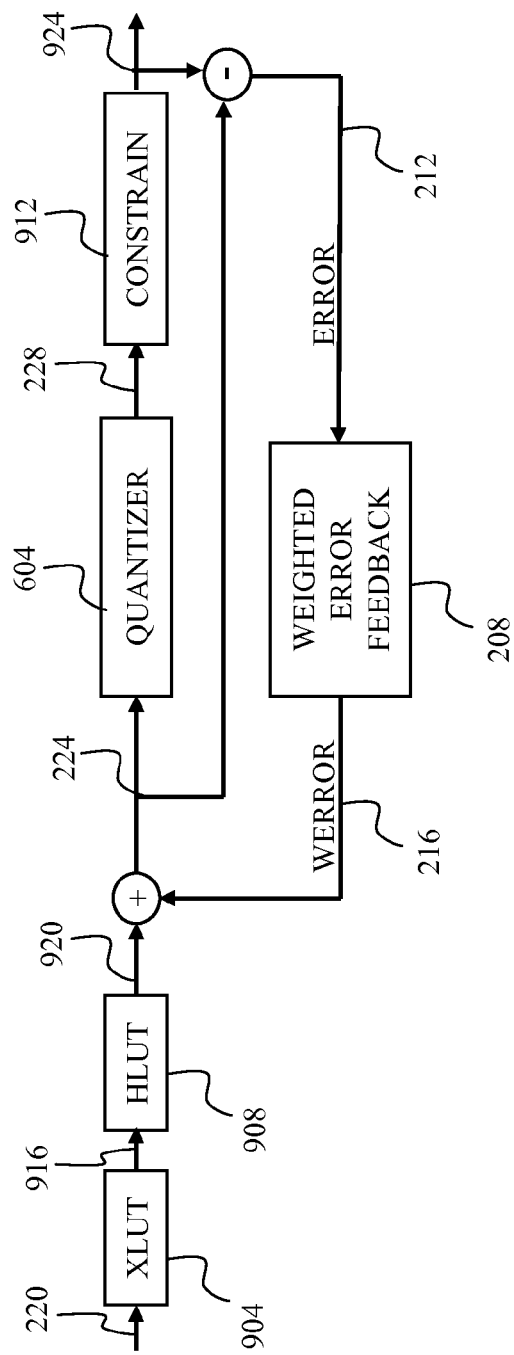
FIG. 9 shows a general method description.

In FIG. 9 there are five main components, XLUT component 904, HLUT component 908, quantizer component 604, constrain component 912, and weighted error feedback component 208. An input system value 220 passes through one dimensional lookup table 904 to generate a transformed system value 916. An additional HLUT lookup table 908 is applied to generate the value after HLUT conversion 920. After adding a previously calculated weighted error feedback 216 to the current system value 920 to generate modified input value 224, a multilevel quantization module 604 reduces the actual input value 224 to one of possible quantization values (308, 312, 712, 716), to generate output value 228. Output value 228 enters into the constrain component 912 to generate a final output system value 924.

At the final stage an error value 212 is generated ("212"="224"–"924"). The error value 212 is diffused to neighbor input pixel according to standard error diffusion mechanism providing the weighted error feedback 216 added to output value 228 as explained previously.

Figure 10:
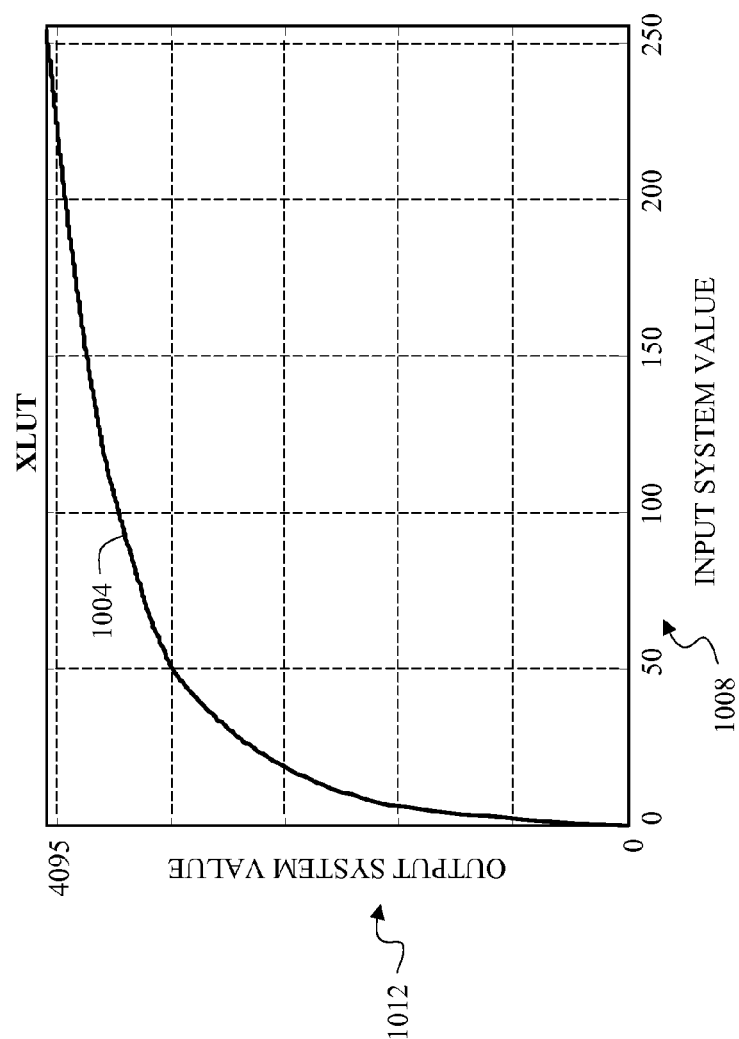
FIG. 10 shows a sample of XLUT curve.

As shown in FIG. 9 a lookup table 904 (XLUT) is applied to the pixel value of the input digital image 220. This lookup table is composed of same number of entries and same of outputs at a precision that can be higher than the input precision. In another word, the number of levels of value after XLUT conversion 916 represented, can be higher than the number of levels of the input image, giving a higher discrimination between printed level. For an 8-bits image the number of input levels of the lookup table 904 is 256, while the output can be defined as 12-bits, means that the number of different levels that as to be differentiated is "916"=4096. FIG. 10 shows an example of a curve 1004 representing a lookup table 904 (XLUT). The input XLUT values 1008 are represented in the X-axis of XLUT curve 1004. The output values 1012 (measured density values of a known target) are represented in the Y-axis of the XLUT curve 1004.

XLUT lookup table 904 may be used for calibration purposes. According to density measurements and predefined density target, lookup table 904 can be generated in order to get a predefined printer response function (predefined density target) in term of dot density as a function of input pixel system value. XLUT lookup table 904 may be seen as a "tonal reproduction curve" applied to image pixel values 220 in order to correct dot gain response of a particular printing system. This type of lookup table is generated on the basis of a small number of points (10-30) compared to the number of levels that the halftoning system is able to generate (4096 levels for a 12 bits system).

This is the role of the halftoning mechanism to generate values 916 (SYSVAL02) printed level by using values 924 (SYSVAL06) quantization levels, reducing a $N_{SYSVAL02}$ levels system to 924 printing system. These $N_{SYSVAL02}$ levels are achieved by determining (halftoning mechanism) the number of output pixels, with a specific quantization value per unit of area. From here a digital dot density can be defined as follow, for constant area with given system value as:

$$D_{patch}(SystemValue) = \frac{\sum_{pixel}\left(1 - \frac{QUANT_{pixel}}{255}\right)}{PatchArea} \quad \text{Eq. 1}$$

Where $D_{patch}$(SystemValue) represent a digital ink density per unit of constant area with pixel value SystenValue. $QUANT_{pixel}$ is the quantization value of the current pixel and PatchArea is the number of pixel included into the original region of interest with constant system value.

Figure 13:
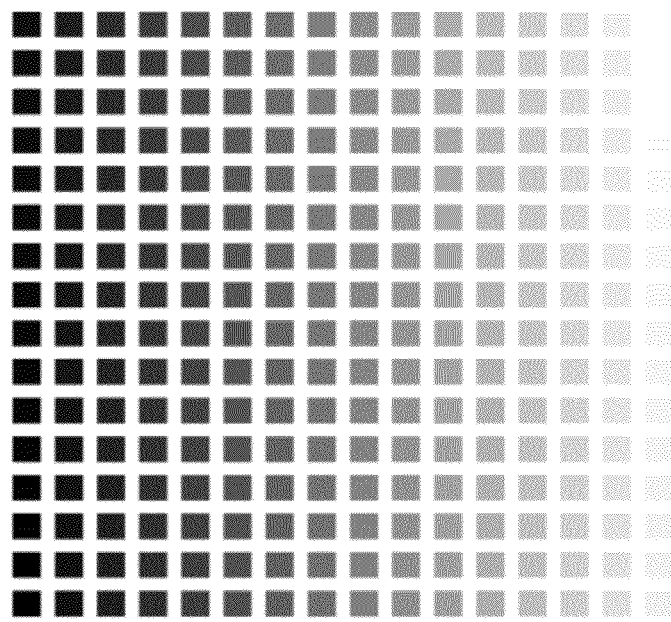
FIG. 13 shows a raster gray scale image 256 patches for 256 increasing levels.
Figure 15:
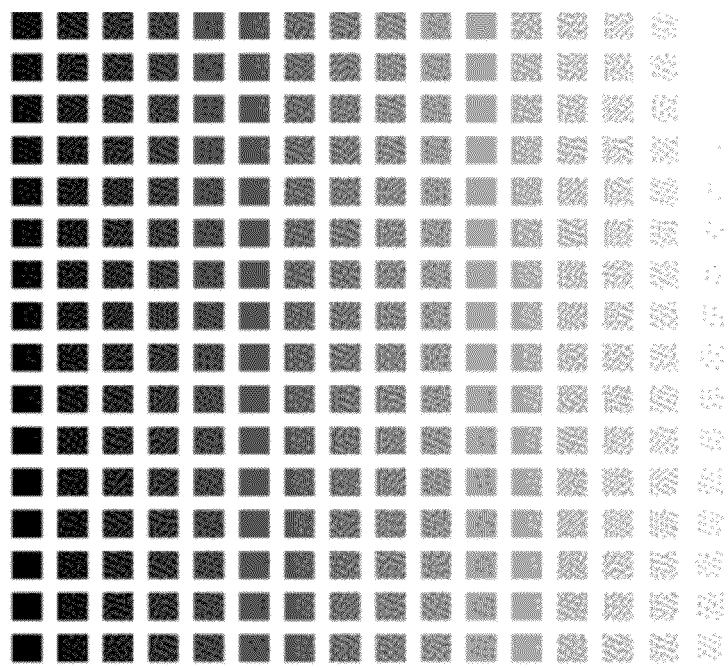
FIG. 15 shows a halftoned raster image of the gray scale raster image.

This is demonstrated in FIG. 13 and FIG. 15. FIG. 13 shows an input 8 bits digital image composed of 256 raster gray scale image patches 1304 where each patch is composed of p by p pixels with a system value that monotonically increases by 1 from value 0 (black) to 255 (white). Each patch is a representative of an input system value of an 8-bits images. Applying the multilevel error diffusion mechanism described in the present document, on patches 1304 will yield an image consisting of halftone generated patches 1504, as is shown in FIG. 15. The output image included pixels with $N_{SYSVAL06}$ different quantization values. In this example $N_{SYSVAL06}$=4 and the quantization value are respectively 0, 85, 170 and 255.

Figure 22:
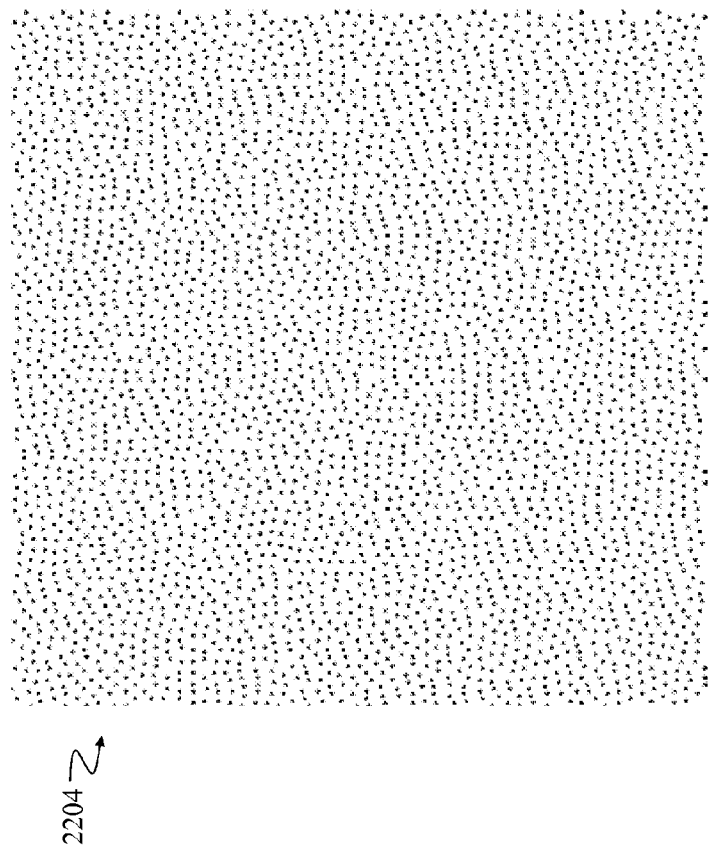
FIG. 22 shows dots distribution at highlight: dots with quantization value of 255 (no dot) and 170 (⅓ dot)

FIG. 22 shows the pixel distribution of a highlight patch 2204 where pixels with a 255 quantization value representing the white background of the image and pixels with a quantization value equal to 170, representing the dot distribution that will be printed on the paper.

Figure 12:
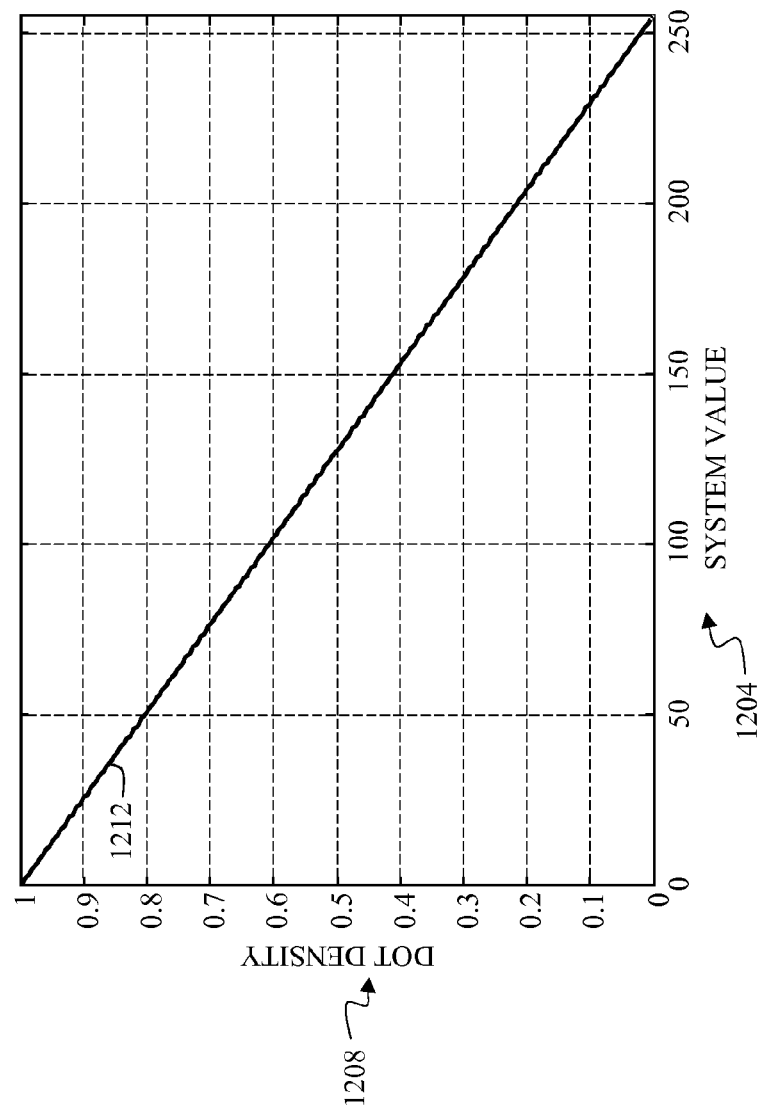
FIG. 12 shows a digital dot density as a function of system value.

Equation 1 is used to calculate for each patch, represented in FIG. 15, the digital dot density 1208 per input system value 1204 (SystemValue). A resulting graph 1212 is shown in FIG. 12. Here a linear behavior of the digital dot density is obtained. This smooth linear monotonic behavior may assure a smooth and monotonic increasing behavior of ink density on the paper as a function of the input system value. This smooth monotonic behavior may be digitally disturbed by constrain component 912 or physical effect related to physical dot gain behavior at quantization value transition, and interaction between drops of different size. These effects may be local effects, means that they will occur at a few levels at transition range. For correction a curve including all the available levels is needed.

Figure 14:
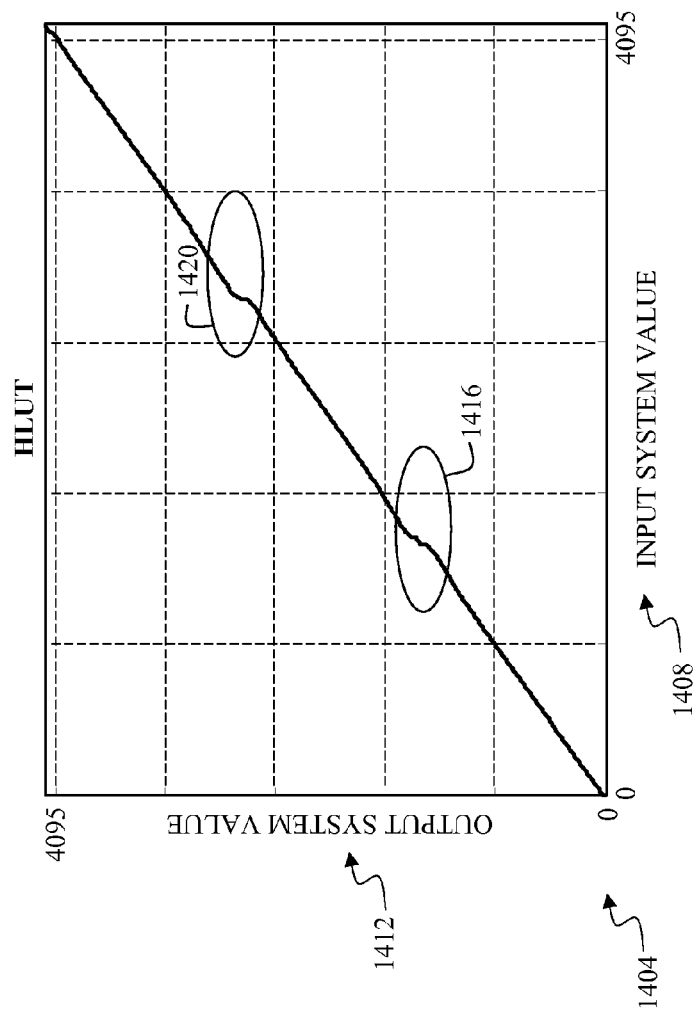
FIG. 14 shows a sample HLUT curve.

Reference is made again to FIG. 9, an additional HLUT lookup table 908 is applied. HLUT provides a way to guarantee that a smooth monotonic behavior will be maintained after applying additional mechanism that will assure a multilevel error diffusion mechanism free of discontinuity 1104 and worming 1108 patterns. FIG. 14 shows a HLUT curve 1404 representing HLUT lookup table 908, also showing two discontinuity points 1416 and 1420. The number of HLUT lookup table 908 input system value entries 1408, equals to the number of levels of modified input values 916. This HLUT lookup table 908 may have number of output levels equal to its number of input levels, but the precision of the HLUT output system values 1412 may be greater (e.g. 12-bits in input and 16-bits in the output). In this case a mechanism should be added to reduce the precision of the output level from e.g. 16-bits to 12-bits; the error diffusion mechanism generates values with precision of 12-bits.

The HLUT lookup table 908 can be generated by performing a digital calibration by using for example Equation 1. Or an experimental calibration procedure can be devised, where patches that represent system values at quantization transition point are measured.

According to multilevel error diffusion frame work a quantizer module is applied, as is shown in FIG. 8, reducing the system from "916" levels to "228" quantization levels (i.e. QUANT01, QUANT02, QUANT03 and QUANT04 for a 4 levels system). Then, according to FIG. 9, after 912 constrain module, an error is calculated to be diffused to neighbor pixels conforming again to standard error diffusion frame work.

Figure 1:
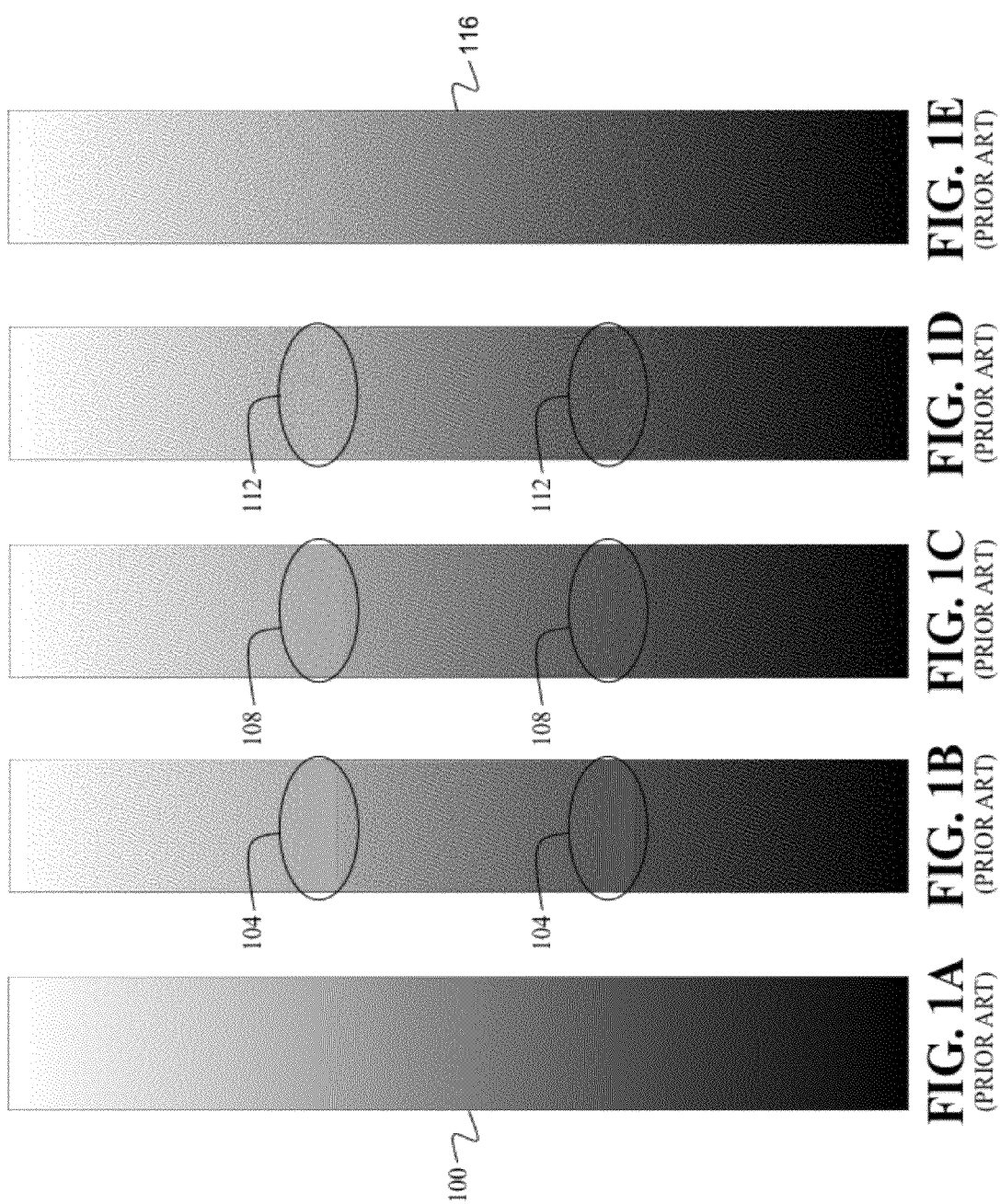
FIG. 1A is a prior art contone original image.
FIG. 1B is a prior art four levels error diffusion image.
FIG. 1C is a prior art corrected error diffusion image without overlap.
FIG. 1D is a prior art corrected error diffusion image with overlap.
FIG. 1E is a prior art corrected error diffusion image with overlap and digital calibration.
Figure 2:
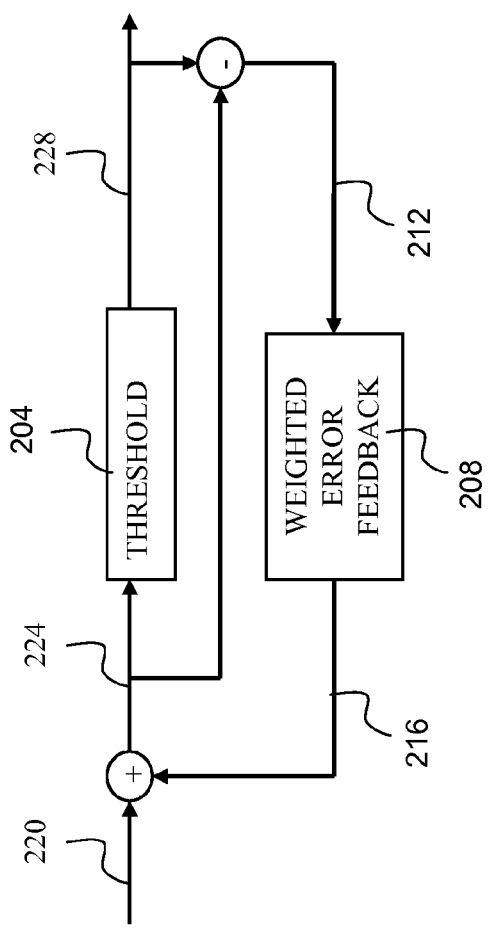
FIG. 2 shows a prior art error diffusion basic technique
Figure 3:
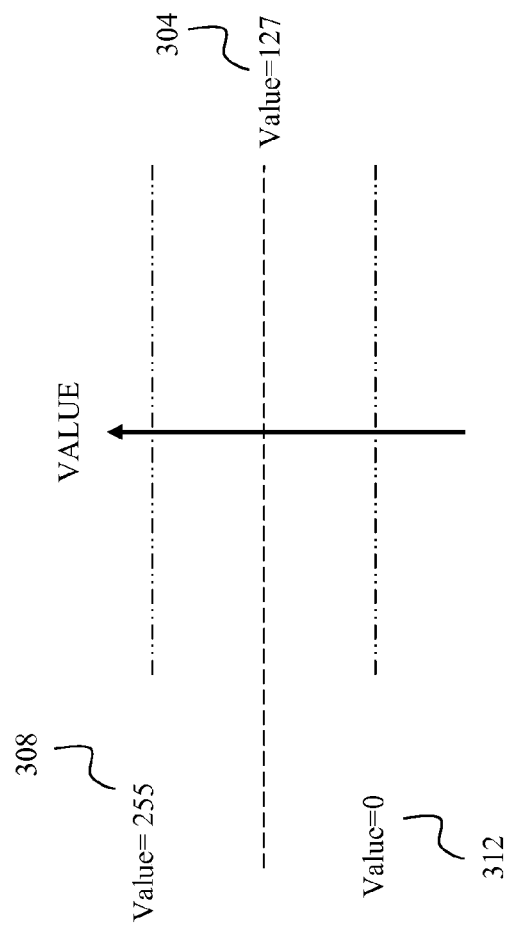
FIG. 3 is prior art showing two quantization levels.
Figure 5:
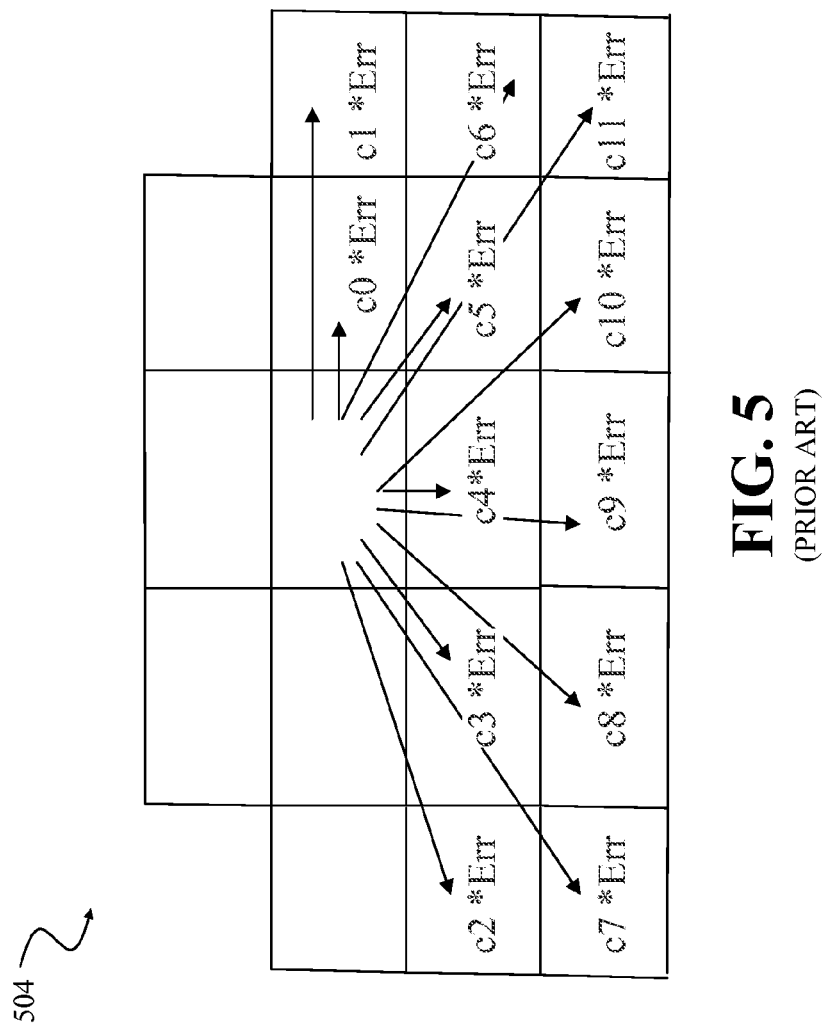
FIG. 5 is prior art showing error diffusion kernel.
Figure 6:
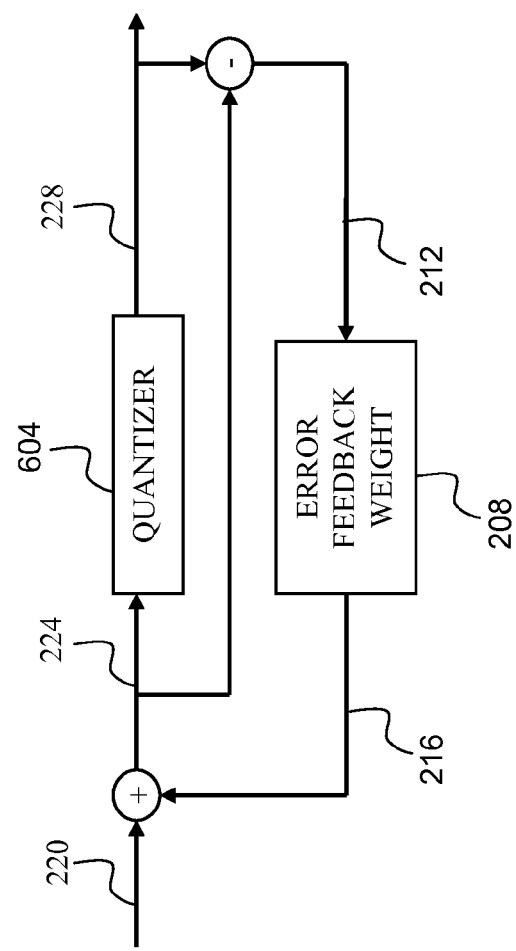
FIG. 6 is prior art showing multilevel error diffusion.
Figure 7:
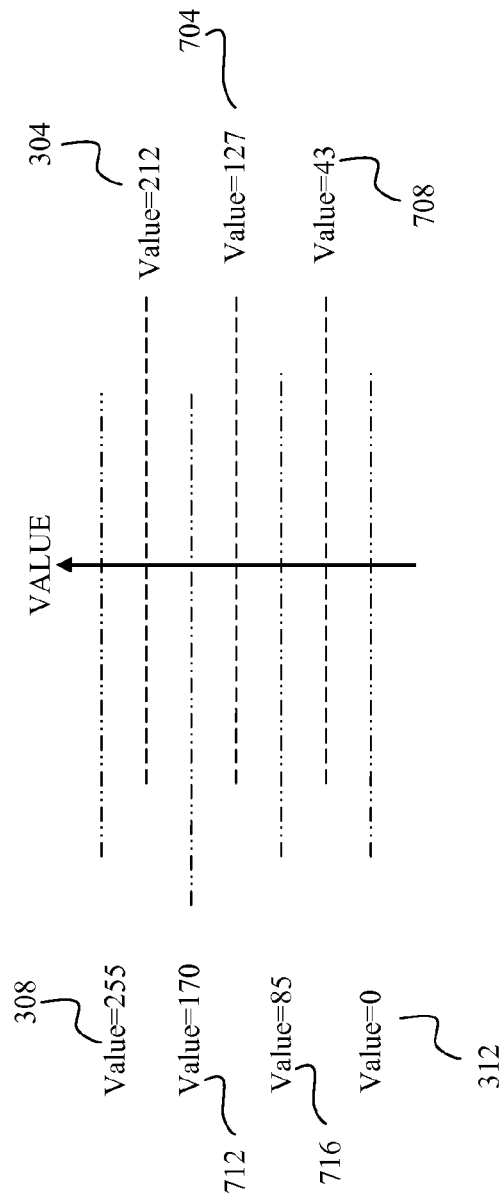
FIG. 7 is prior art showing four quantization levels.
Figure 11A:
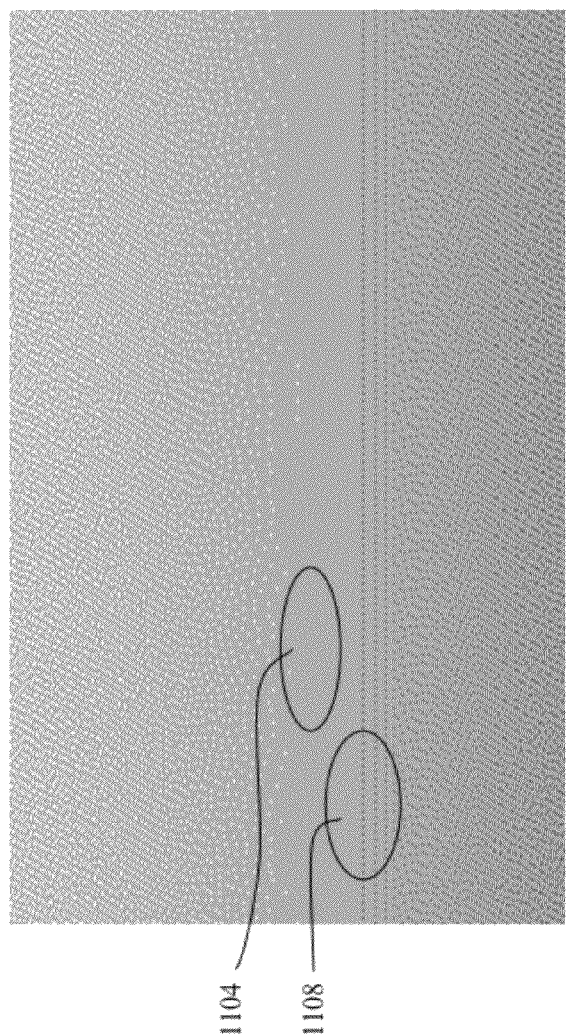
FIG. 11A shows a sample of error diffusion discontinuity and "worm" patterns at quantization level.

Constrain component 912 will guarantee an overall error diffusion mechanism free of discontinuity 1104 and worming 1108 patterns. Applying the described multilevel error diffusion mechanism without any constrain, on a continuous tone vignette image 100 as is shown in FIG. 1A, a resulting halftone image is obtained. The results as is shown FIG. 1B contains artifacts 104; texture artifact or "worm" pattern (see 1104 FIG. 11A) and discontinuity (see 1108 FIG. 11A) at quantization transition points.

The purpose of this patent is to propose a mechanism that will generate screen data with a pleasant dot distribution, free of "worm" pattern and discontinuity, keeping smooth and monotonic behavior tonal curves. This goal can be achieved by applying the constrain module as shown in FIG. 9. The proposed solution takes control of pixel density or position for specific quantization levels, bypassing error diffusion mechanism.

Figure 23:
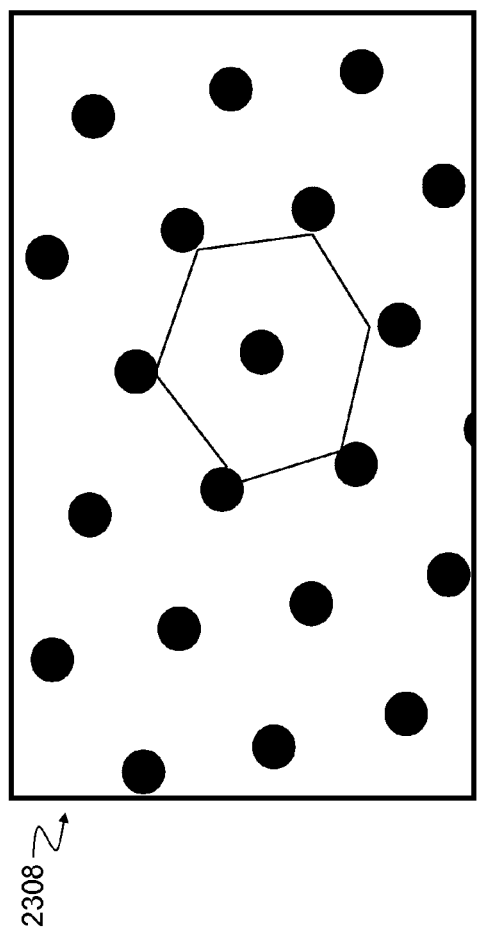
FIG. 23 shows a theoretical halftone dot distribution for a given system value.

FIG. 23 shows a theoretical highly uniform texture distribution of dot corresponding to the same quantization value. The dot arrangement 2308 is homogeneously spatially distributed, as theoretically expected from a stochastic halftoning mechanism for an area with a uniform input system value.

Figure 11B:
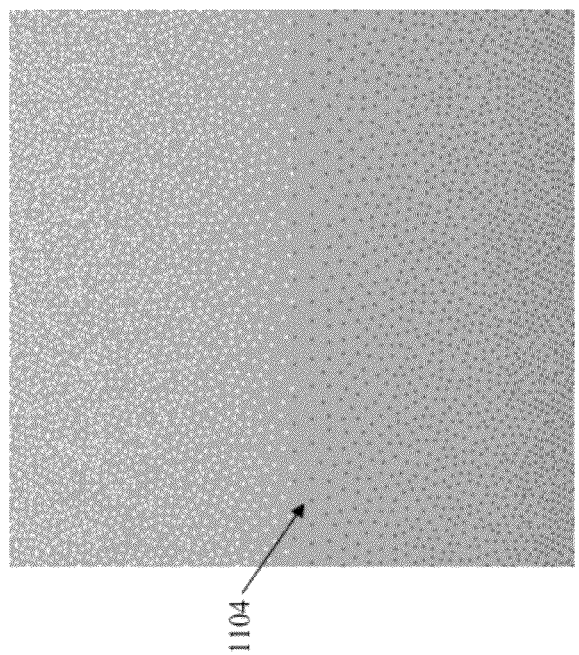
FIG. 11B shows a sample of error diffusion discontinuity at quantization level.
Figure 11C:
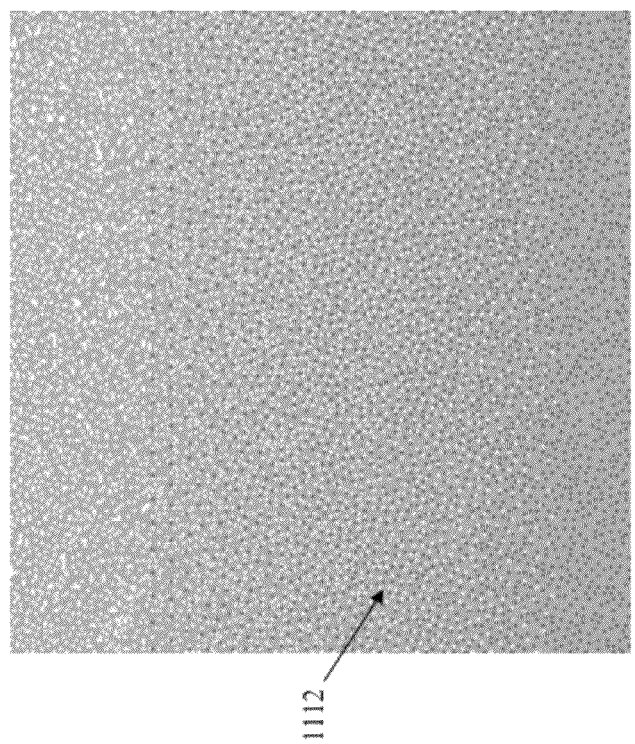
FIG. 11C shows a sample of error diffusion free of discontinuity and "worm" patterns at quantization level.

This homogeneously dot distribution is a theoretically required dot distribution at quantization transition levels; free of "worm" patterns. As shown in FIG. 1C, solving "worm" patterns does not assure a smooth transition at quantization level. Immediate apparition of pixels with a different quantization value still generates a sharp transition or discontinuity 1104; see FIG. 11B. In this example the transition quantization value is 170 (background color) where dots with quantization value equal to 255 (white point) appear on the upper side of the transition quantization value 170. On the lower side of the quantization transition, dot with quantization value 85 (darker dots) start to appear. This sharp transition can be smoothening by allowing migration and mixing of dot with different quantization value around the quantization level as shown in FIG. 1D. Here dots with quantization value 255, 170, and 85 are mixed region 1112 of the quantization level 170 as shown in FIG. 11C.

Figure 16B:
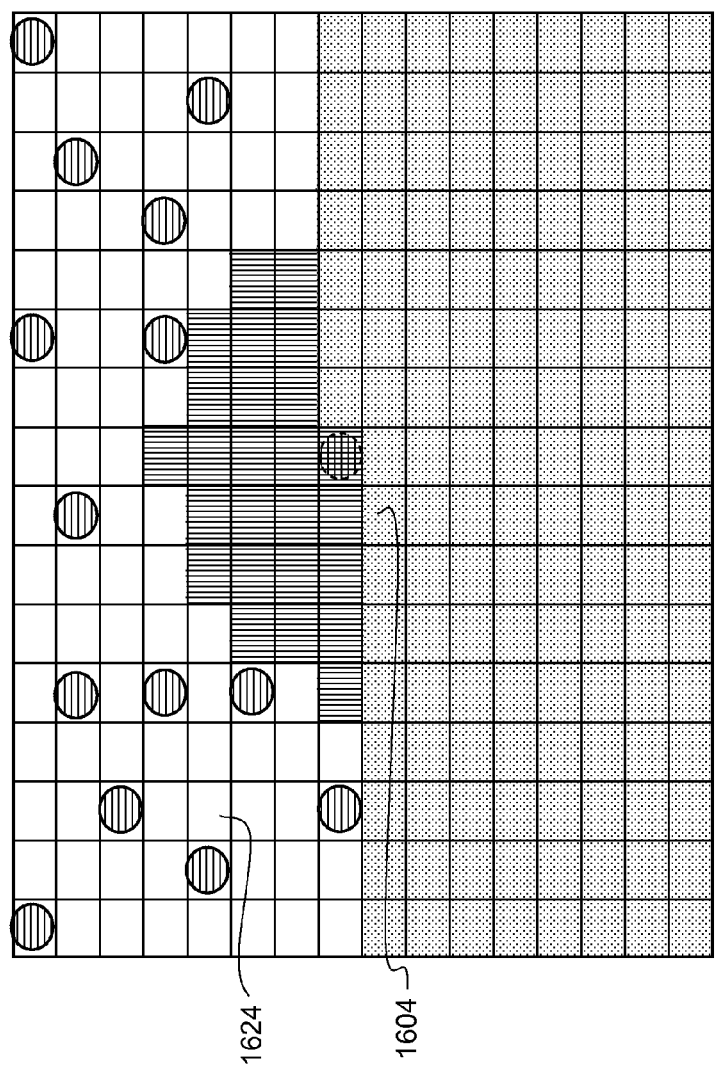
FIG. 16B shows an example of mask that can be used as constrain per system value.
Figure 16C:
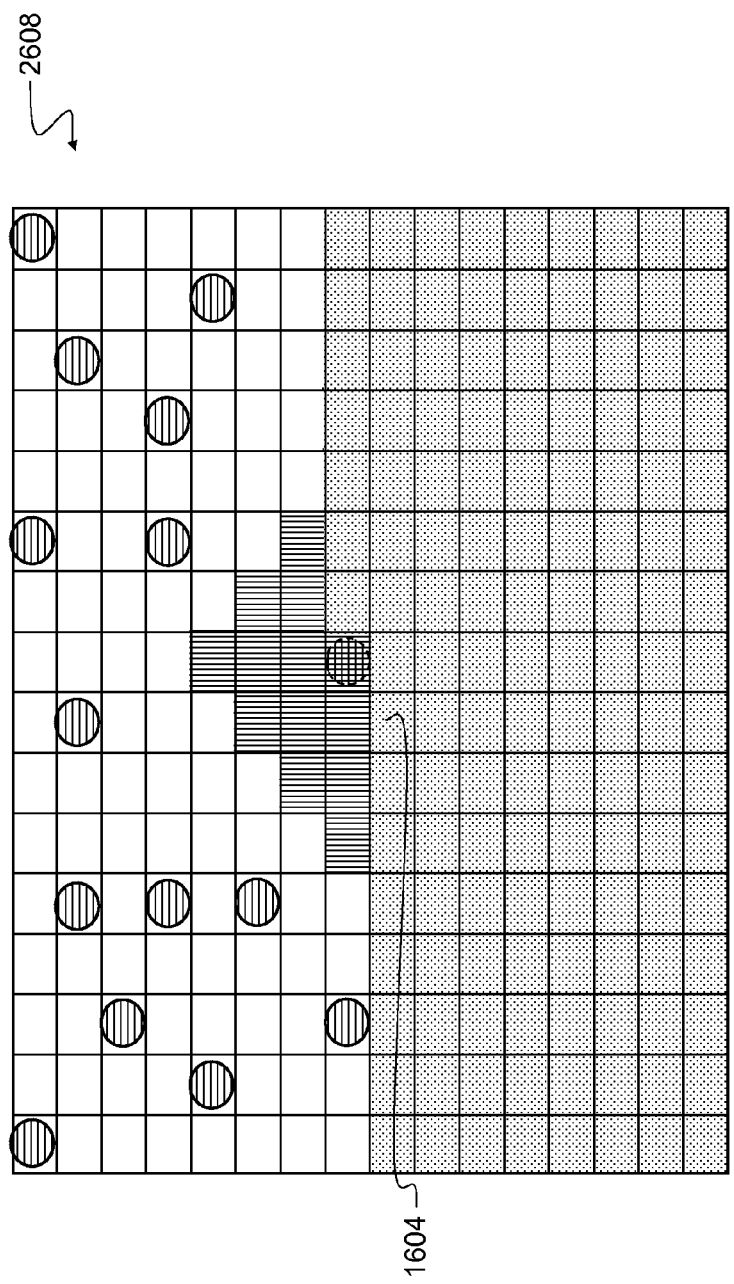
FIG. 16C shows an example of mask that can be used as constrain per system value.
Figure 16D:
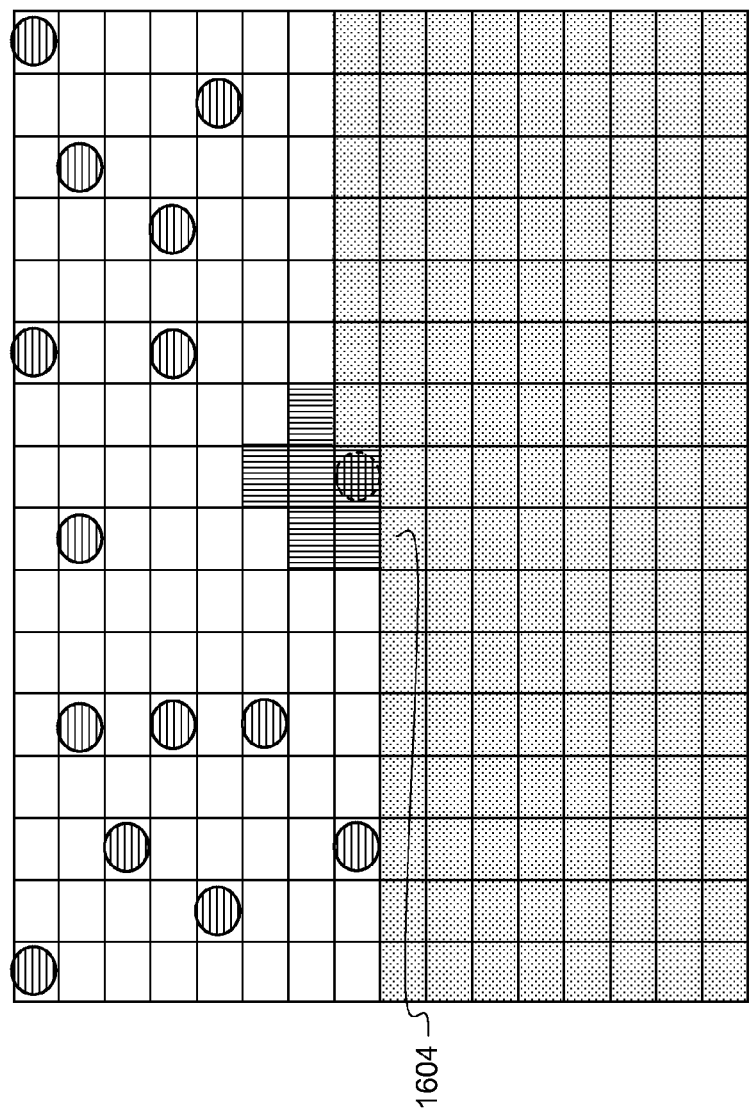
FIG. 16D shows an example of mask that can be used as constrain per system value.
Figure 19A:
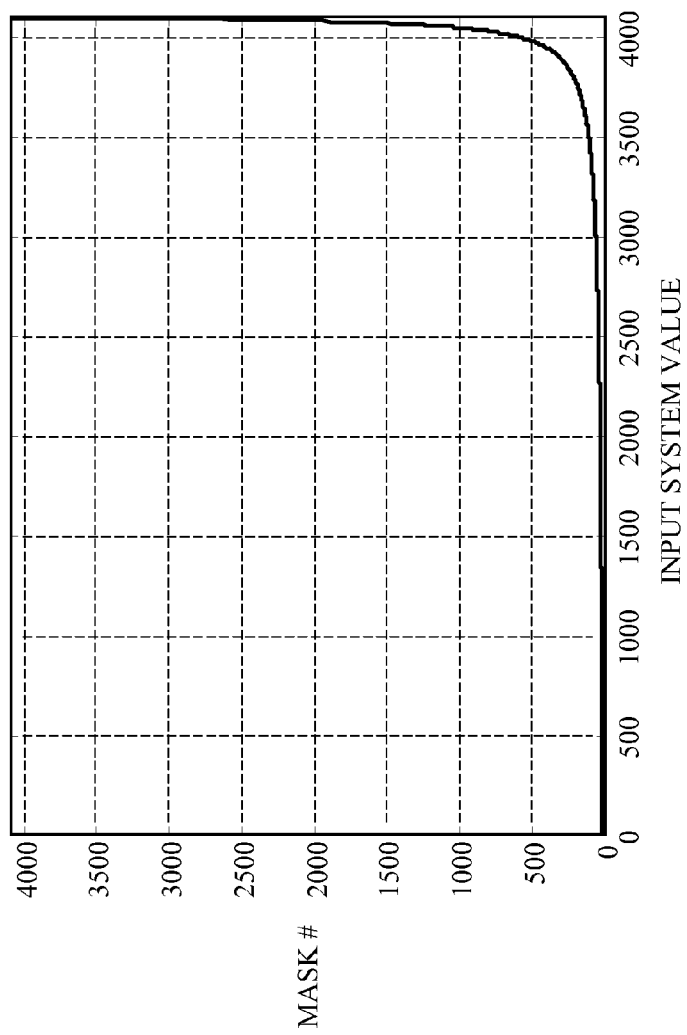

In the proposed invention, a mask named "convex mask" is used in order to apply some constrain that will change (if needed) the resulting quantization value generated by the quantizer module. As shown in FIG. 23, for theoretically uniform distribution of dots, at given system value, a convex area can be defined by surrounding dots around a pixel of interest. These dots form a convex envelop containing one dot. The area surrounded by this set of points is named into this text a "convex mask." Forcing pixels to be set to specified quantization values, into the area of predefined "convex mask" will assure a uniformly dot distribution of the screen data for a specific quantization value. A predefined "convex" mask" 1604 is show in FIG. 16A. The grid that represents pixels to be set to specific quantization value is devised into two parts 1608 and 1612. The white pixel part 1608 show pixels that were already processed 1620 are set to a specific quantization value, comparing the gray part 1612 where pixels that need to be computed. The pixel into consideration or actual pixel 1616 is appearing in the grid center, in the middle of a predefined "convex mask" 1604. Only pixels appearing into the mask in the upper part 1624 of the mask (FIG. 16B) will be used for comparison for the constrain module. Accordingly, a library of predefined "convex masks" can be defined as shown in FIGS. 16B-16D. Those masks can be ordered according to mask area (in pixels units) and associated to a specific input system value. For example, for 12-bits system, such a library can include 4095 different mask dissimilar by their area and geometry. Now, as it shown in FIG. 19A, to a specific input system value a mask number from a mask library can be associated, in order to use a different mask per system value if needed.

The present invention proposes the use of a multitude of predefined "convex masks" 1604 associated to any type of constrain wherein plurality of libraries can be used, each library contains different set of masks. In addition, for each transition quantization values different association curves can be used as shown in FIG. 19B and FIG. 19C.

The "convex mask" can be used with constrains as follow: If a pixel, with a "specific quantization value 1", does not appear into a predefined "convex mask 1", it will be set to the "specific quantization value 1" (see FIG. 17). Additionally, if a pixel of another "specific quantization value 2" does appear into another region of interest specified by another "convex mask 2", the mechanism will not force the actual pixel to be set to the previous "specified quantization value 1" (see FIG. 18). As it is shown in FIG. 17 and FIG. 18 noise mechanisms can be added in order to break any periodic pattern that may occurred.

Figure 19B:
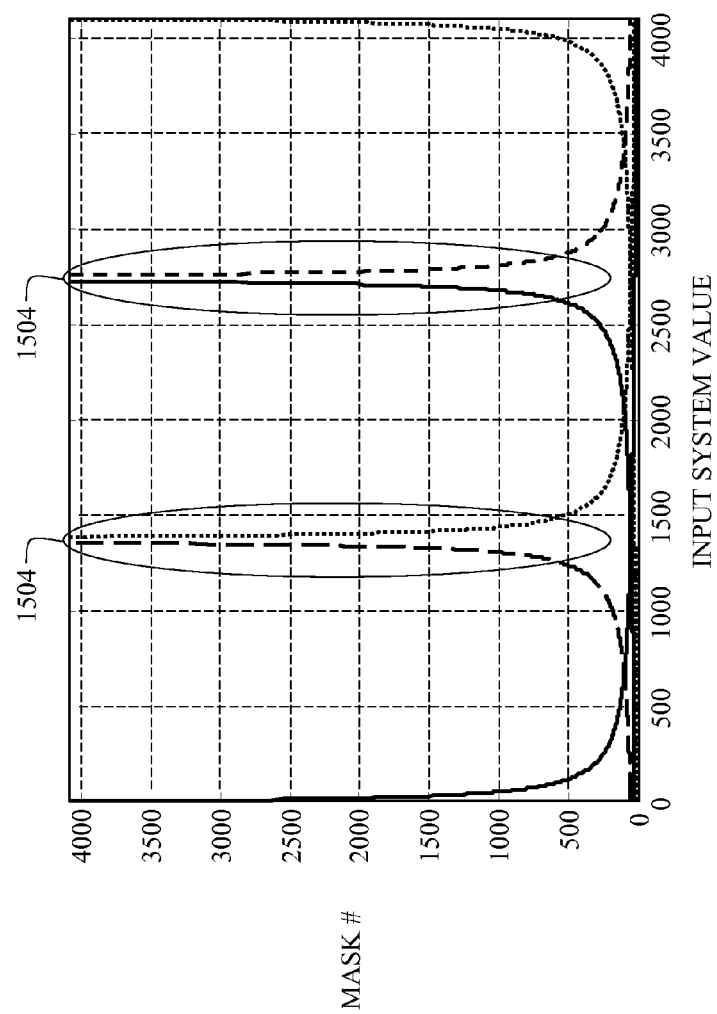

FIG. 1C show the resulting screen data when "convex mask" relationship with input system values are defined by FIG. 19B. Here the migration of pixels with different quantization value are not allow. The "worm" pattern disappears, however a discontinuity 108 remains at quantization value transition.

By applying "convex mask" relationship as show in FIG. 19C, an overlap between quantization regions appears as shown in FIG. 1D. In this case no worm patterns and no discontinuity patterns 112 can be observed.

Figure 20:
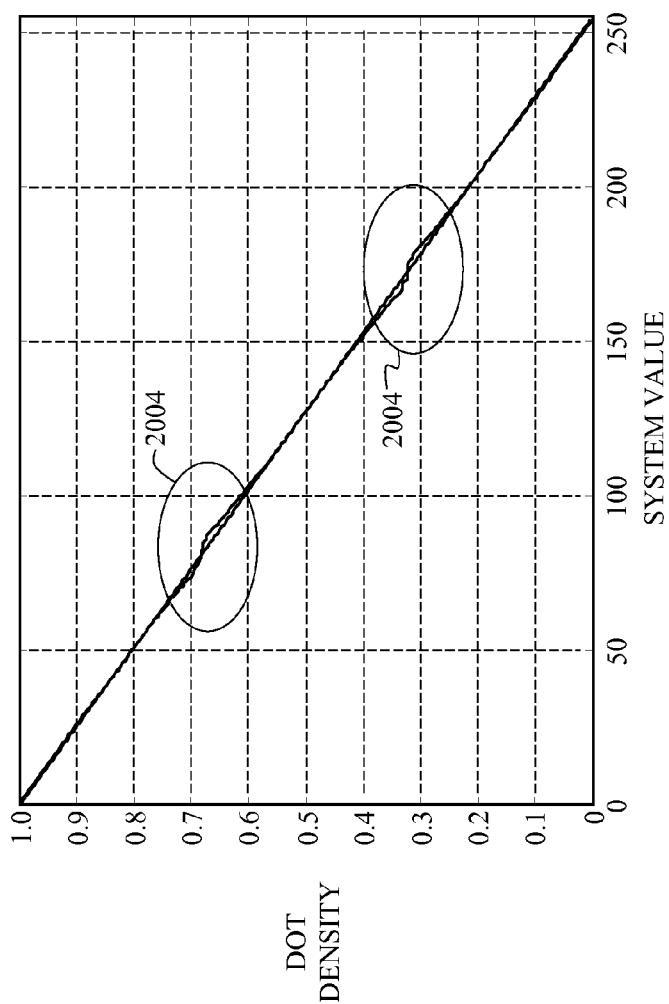
FIG. 20 shows a digital dot density.
Figure 21:
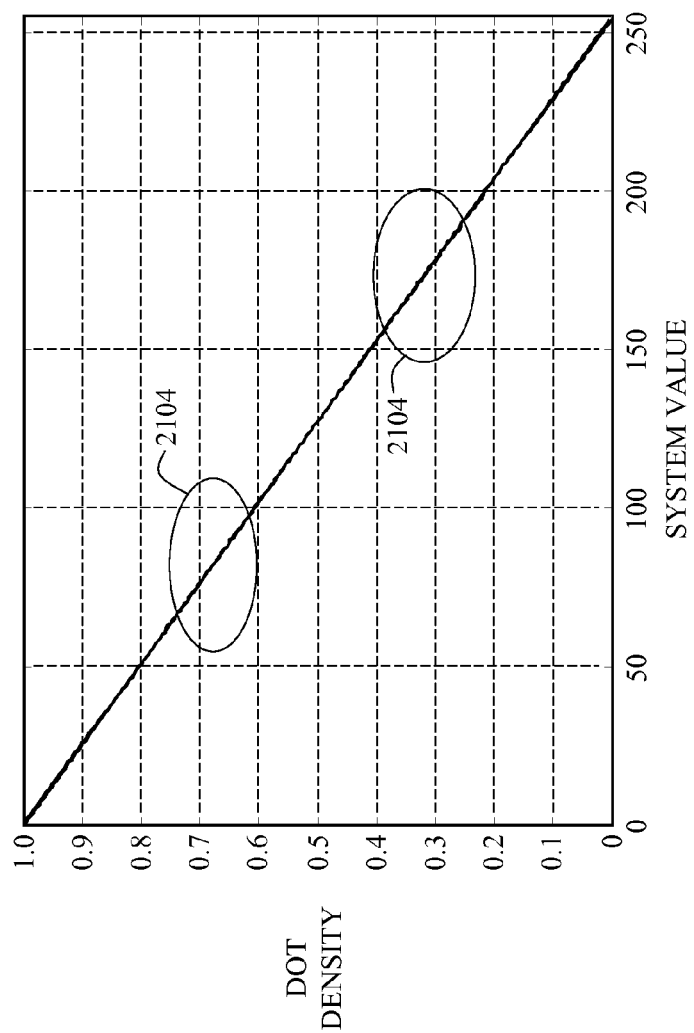
FIG. 21 shows a corrected digital dot density.

Constrains are applied in a way that will not disturb the pleasant error diffusion patterns. This limitation may induce a local non monotonic behavior as is shown in FIG. 20. Here, there is a local non-smooth monotonic 2004 increasing curve of the digital dot density. This is corrected 2104 in FIG. 21, where corrected function 2104 is shown after HLUT lookup table shown in FIG. 14 is applied. As a result a smoother halftoned vignette image 116 is obtained (shown FIG. 1E).

The invention has been described in detail with particular reference to certain preferred embodiments thereof, but it will be understood that variations and modifications can be effected within the scope of the invention.

PARTS LIST

100 continuous tone vignette image
104 texture artifacts (worm and discontinuity)
108 discontinuity effect only
112 no worm and no discontinuity patterns shown
116 smoother halftoned vignette image
204 threshold computing component
208 weighted error feedback component
212 error value
216 weighted error value
220 continuous tone input value (SYSVAL01)
224 modified input value (SYSVAL02)
228 output value (SYSVAL03)
304 first threshold value (THR01)
308 first quantization value (QUANT01)
312 last quantization value (QUANT02)
504 error diffusion kernel matrix
604 multilevel quantization component
704 second threshold value (THR02)
708 third threshold value (THR03)
712 third quantization value (QUANT03)
716 fourth quantization value (QUANT04)
904 XLUT lookup table
908 HLUT lookup table
912 constraint component
916 value after XLUT conversion
920 value after HLUT conversion
924 output value after constraint component conversion
1004 XLUT curve
1008 input XLUT values
1012 measured density values representing a known target
1104 discontinuity pattern
1108 "worm" pattern
1112 mixed region
1204 system value input
1208 measured dot density output
1212 a response function of 1208 as a function of 1204
1304 raster gray scale image 256 patches for 256 increasing levels
1404 HLUT curve
1408 HLUT input system value
1412 HLUT output system value
1416 first discontinuity
1420 second discontinuity
1504 halftone raster image of the gray scale raster image
1604 convex mask
1608 white pixels part
1612 gray pixels part
1616 actual pixel
1620 previously processed pixels
1624 upper part mask
2004 local spots of non-monotonic smoothness
2104 corrected non-monotonic spots
2204 dots distribution at highlight: dots with quantization value of 255 (no dot) and 170 (⅓ dot)
2308 dots arrangement

The invention claimed is:

1. A method for improving printing quality of a digital image using error diffusion screening comprising:
   a) initializing a weighted error diffusion value on a processor;
   b) translating a first value of each pixel of said digital image to a second value wherein said second value is represented by at least a same number of bits as said first value to enhance toning;
   c) translating said second value of each pixel of said digital image to create a third value wherein said third value is represented by at least the same number of bits as said second value to smooth non-monotonic behavior during digital quantization due to a processor precision limitation or a physical behavior;
   d) translating said third value of each pixel of said digital image by adding said error diffusion value to create a fourth value;
   e) generating a first quantization value for each pixel in said digital image by performing quantization on said fourth value of each pixel of said digital image using at least one threshold value;
   f) performing geometrical distribution in space of said first quantization value comprising the steps of:
      analyzing location and value of neighboring quantization values designated by a first pixel mask and a second pixel mask;
      if a pixel with said first quantization value appears in the area designated by said first pixel mask or a second quantization value appears in the area designated by said second pixel mask then go to step (g);
      if a pixel with said first quantization value does not appear in the area designated by said first pixel mask and a second quantization value does not appear in the area designated by said second pixel mask then set a pixel in said area designated by said first pixel mask to said first quantization value;
   g) update said error diffusion value and go to step (b) till all the pixels of said digital image are treated; and
   h) printing the digital image.

2. The method according to claim 1 wherein said first pixel mask is defined by a structure of at least one-dimensional pixel array.

3. The method according to claim 1 wherein said first pixel mask is selected according to the content said fourth value.

4. The method according to claim 1 wherein said second pixel mask is defined by a structure of at least one-dimensional pixel array.

5. The method according to claim 1 wherein said second pixel mask is selected according to the content said fourth value.

6. The method according to claim 1 wherein noise is added to said fourth value prior to quantization treatment.

7. The method according to claim 1 wherein said physical behavior is different dot size.

8. The method according to claim 1 wherein said first pixel mask is selected according to the value of at least one of the group of said first value, said second value, said third value and said fourth value.

9. The method according to claim 1 wherein said first pixel mask and said second pixel mask are selected from a plurality of pixel masks in at least one mask library.

10. The method according to claim 9 wherein each library from said at least one mask library is categorized by a specific library type.

* * * * *